United States Patent
Chung et al.

(10) Patent No.: US 6,479,600 B2
(45) Date of Patent: Nov. 12, 2002

(54) POLYOLEFIN CONTAINING A TERMINAL PHENYL OR SUBSTITUTED PHENYL GROUP AND PROCESS FOR PREPARING SAME

(75) Inventors: Tze-Chiang Chung, State College, PA (US); Jin Yong Dong, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 130 days.

(21) Appl. No.: 09/756,261

(22) Filed: Jan. 8, 2001

(65) Prior Publication Data

US 2002/0132943 A1 Sep. 19, 2002

(51) Int. Cl.$^7$ .......................... C08F 4/642; C08F 4/643; C08F 212/08; C08F 212/14
(52) U.S. Cl. ...................... 526/160; 526/127; 526/134; 526/279; 526/293; 526/296; 526/318.1; 526/310; 526/347; 526/347.1; 526/348; 526/905
(58) Field of Search ................................. 526/127, 134, 526/160, 279, 293, 296, 318.1, 310, 347, 347.1, 348, 905

(56) References Cited

U.S. PATENT DOCUMENTS

| | | | |
|---|---|---|---|
| 3,265,765 A | 8/1966 | Holden et al. | 260/876 |
| 4,530,914 A | 7/1985 | Ewen et al. | 502/113 |
| 4,542,199 A | 9/1985 | Kaminsky et al. | 526/160 |
| 4,665,047 A | 5/1987 | Slaugh et al. | 502/108 |
| 4,752,597 A | 6/1988 | Turner | 502/104 |
| 4,946,899 A | 8/1990 | Kennedy et al. | 525/244 |
| 5,026,798 A | 6/1991 | Canich | 526/127 |
| 5,272,236 A | 12/1993 | Lai et al. | 526/348.5 |
| 5,543,484 A | 8/1996 | Chung et al. | 526/347.1 |
| 5,703,187 A | 12/1997 | Timmers | 526/282 |
| 5,866,659 A | 2/1999 | Chung et al. | 525/279 |
| 5,939,495 A | 8/1999 | Kioka et al. | 252/356 |
| 6,015,862 A | 1/2000 | Chung et al. | 525/320 |
| 6,096,849 A | 8/2000 | Chung et al. | 525/336 |

OTHER PUBLICATIONS

Brookhart et al., Macromolecules 28 (1995) 5378–5380.*
Doi et al., Makromol. Chem. 188 (1987) 1273–1279.*
Bergbreiter et al, Polyethylene–Bound Rhodium (I) Hydrogenation Catalysts, *J. Am. Chem. Soc;*, 1987, vol. 109, No. 1, pp. 174–179.
Risse et al, A Novel Route to Block Copolymers by Changing the Mechanism from Living Ring–Opening Metathesis Polymerization of Cyclic Olefins to Aldol Condensation of Silyl Vinyl Ethers, *Macromolecules*, 1989, vol. 22, No. 4, pp. 1558–1562.
Doi et al, Synthesis and Characterization of Terminally Functionalized Polypropylenes, *Makromol. Chem.*, vol. 188, 1987, pp. 1237–1279.

Doi et al, Mechanism of Chain Propagation in "Living" Polypropylene Synthesis. $^1$H and $^{13}$C NMR Analyses of Chain–End Structures, Makromol. Chem 186 (1985), pp. 1825–1834.
Doi et al, Reaction of Carbon Monoxide with Living Polypropylene prepared with a Vanadium–Based Catalyst, *Makromol. Chem., Rapid Commun.*, vol. 5, pp. 811–814, 1984.
Yasuda et al, New Approach to Block Copolymerizations of Ethylene with Alkyl Methacrylates and Lactones by Unique Catalysis with Organolanthanide Complexes, *Macromolecules*, vol. 25, No. 19, pp. 5115–5116, 1992.
Brookhart et al, Cobalt(III)–Catalyzed Living Polymerizations of Ethylene: Routes to End–Capped Polyethylene with a Narrow Molar Mass Distribution, *Macromolecules*, vol. 28, No. 15, pp. 5378–5380, 1995.
Shiono et al, Synthesis of Carboxy– and Chloro–Terminated Poly(Propylene)s Using Zn(C$_2$H$_5$)$_2$ as Chain Transfer Reagent, *Makromol. Chem.*, vol. 193, pp. 2751–2761, 1992.
Kurosawa et al, Synthesis of α,ω–Dialkenyl Isotactic Poly(Propylene) Using Bis(4–Methyl–3–Pentenyl)Zinc as a Chain transfer Reagent, *Makromol. Chem*, vol. 195, pp. 3303–3309, 1994.
Lu et al, New Maleic Anhydride Modified PP Copolymers with Block Structure: Synthesis and Application in PP/Polyamide Reactive Blends, *Macromolecules*, vol. 32, No. 8, pp. 2525–2533, 1999.
Lu et al, Maleic Anhydride Modified Polypropylene with Controllable Molecular Structure: New Synthetic Route via Borane–Terminated Polypropylene, *Macromolecules*, vol. 31, No. 17, pp. 5943–5946, 1998.

(List continued on next page.)

Primary Examiner—David W. Wu
Assistant Examiner—R. Rabago
(74) Attorney, Agent, or Firm—Anthony J. DeLaurentis

(57) ABSTRACT

Functional polyolefin material containing a terminal styrene or styrene derivative unit and having the following molecular structure:

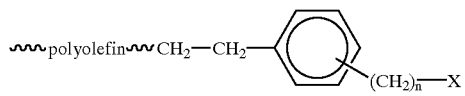

in which polyolefin is a homopolymer or copolymer prepared by metallocene-mediated coordination polymerization of linear, branched or cyclic $C_3$–$C_{18}$ alpha-olefins and/or diolefins, in which the molecular weight of polyolefin segment is above 500 g/mole, preferably in the range between 10,000 to 1,000,000 g/mole, in which the number of methylene spacer units (n) is between 0 and 6, and preferably between 0 and 3, and in which X is a group selected from H, Cl, Br, I, OH, $NH_2$, COOR, O—$BR_2$, O—$SiR_3$, $N(SiR_3)_2$, $BR_2$, $SiR_3$ (where R is a $C_1$ to $C_{10}$ linear, branched, cyclic or aromatic alkyl group), CH=$CH_2$, COOH, COOLi, and succinic anhydride, is disclosed. Also disclosed is a process for preparing the functional polyolefin material.

24 Claims, No Drawings

OTHER PUBLICATIONS

Chung et al, A Novel Synthesis of PP–b–PMMA Copolymers Via Metallocene Catalysis and Borane chemistry, *Polymer*, vol. 38, No. 6, pp. 1495–1502, 1997.

Mulhaupt et al, Novel Polypropene Materials Derived from Vinylidene–Terminated Oligopropenes, *Polymers for Advanced Technologies*, vol. 4, pp. 439–449, 1993.

Shiono et al, Synthesis of Terminally Aluminum–Functionalized Polypropylene, *Macromolecules*, vol. 25, No. 13, pp. 3356–3361, 1992.

Shiono et al, Synthesis of Polypropylene Functionalzied with Secondary Amino groups at the Chain Ends,, *Macromolecules*, vol. 26, No. 8, 2085–2089, 1993.

Shiono et al, Novelty of Vinyliden–Terminated Polypropylene Prepared by a $MgCl_2$–Supported $TiCl_4$ Catalyst Combined with $AlEt_3$ as Cocatalyst, *Macromolecules*, vol. 30, No. 20, pp. 5997–6000, 1997.

Koo et al, Silanolytic Chain Transferin Ziegler–Natta Catalysis Organotitanium–Mediated Formation of New Silapolyelefins and Polyolefin Architectures, *J. Am. Chem. Soc.*, vol. 120, No. 16, pp. 4019–4020, 1998.

Fu et al, Silanes as Chain transfer Agents in Metallocene–Mediated Olefin Polymerization. Facile in Situ Catalytic Synthesis of Silyl–Terminated Polyolefins, *J. Chem. Soc.*, vol. 117, No. 43, pp. 10747–10748, 1995.

Koo et al, Organolanthanide–Mediated Silanolytic Chain Transfer Process. Scope and Mechanism of Single Reactor Catalytic Routes to Silapolyolefins, *Macromolecules*, vol. 32, No. 4, pp. 981–988, 1999.

Xu et al, Borane Chain Transfer Agent in Metallocene–Mediated Olefin Polymerization. Synthesis of Borane–Terminated Polyethylene and Diblock Copolymers Containing Polyethylene and Polar Polymer, *J. Am. Chem. Soc.*, vol. 121, No. 28, pp. 6763–6764, 1999.

Xu et al, Synthesis of Syndiotactic Polystyrene (s–PS) Containing a Terminal Polar Group and Diblock Copolymers Containing s–PS and Polar Polymers, *Macromolecules*, vol. 32, No. 25, pp. 8689–8692, 1999.

Ringelberg et al, Thiophene C–H Activation as a Chain Transfer Mechanism in Ethylene Polymerization: Catalytic Formation of Thienyl–Capped Polyethylene, *J. Am. Chem. Soc.*, vol. 121, No. 25, pp. 6082–6083, 1999.

Byun et al, Selective Chain Transfer Reactions in Metallocene Catalyzed Copolymerization of Ethylene with Allylbenzene, *Macromolecules*, vol. 33, No. 6, pp. 1921–1923, 2000.

Lu et al, Synthesis of Polypropylene–co–p–Methylstyrene Copolymers by Metallocene and Ziegler–Natta Catalysts, *J. Polym. Sci.: Part A: Polymer chem.*, vol. 37, pp. 2795–2802, 1999.

Kang et al, Synthesis of Aluminum–Terminated Polypropylene by a $MgCl_2$–Supported $TiCl_4$ Catalyst combined with $Al)I–Bu)_3$ as Cocatalyst, *Macromolecules*, vol. 30, No. 4, pp. 1231–1233, 1997.

* cited by examiner

US 6,479,600 B2

POLYOLEFIN CONTAINING A TERMINAL PHENYL OR SUBSTITUTED PHENYL GROUP AND PROCESS FOR PREPARING SAME

FIELD OF THE INVENTION

This invention relates to functional polyolefiln material that contains a terminal phenyl or substituted phenyl group, and to a process for its preparation. More particularly, this invention relates to a functional polymer having a polyolefin polymer backbone that is a homopolymer or copolymer prepared by metallocene coordination polymerization of linear, branched or cyclic $C_3$–$C_{18}$ alpha-olefins and/or diolefins, in which the molecular weight of polyolefin backbone is above about 500 g/mole, preferably from about 10,000 to 1,000,000 g/mole. The process by which the functional polymer material is prepared involves a novel sequential chain transfer reaction, first to styrene (or a styrene derivative) and then hydrogen, during the transition metal mediated olefin polymerization, to produce polyolefin having a terminal phenyl or substituted phenyl group.

BACKGROUND OF THE INVENTION

Although useful in many commercial applications, polyolefins suffer a major deficiency, i.e., poor interaction with other materials. The inert nature of polyolefins significantly limits their end uses, particularly those in which adhesion, dyeability, paintability, printability or compatibility with other functional polymers is paramount. Polymers containing a terminal functional group are particularly desirable materials. For example, they can be used as interfacial agents during reactive extrusion processes to improve adhesion and compatibility in polymer blends and composites. Polymers containing a terminal functional group also can serve as reactive building blocks for the preparation of block and graft copolymers.

In general, the chemistry for introducing a functional group to the chain end of a vinyl polymer is very limited. Usually, these polymers are prepared by terminating living polymers with suitable reagents. The anionic, cationic, and metathesis living polymerizations are particularly preferred because they provide a stable propagating active site that can be converted effectively to the desired functional group at the polymer chain end. [For examples of anionic living polymerization, see, e.g., U.S. Pat. No. 3,265,765 and D. E. Bergbreiter et al, *J. Am. Chem. Soc.*, 109, 174, 1987; for cationic living polymerization, see, e.g., U.S. Pat. No. 4,946, 899; and for metathesis living polymerization, see, e.g., R. H. Grubbs, et al, *Macromolecules*, 22, 1558, 1989]. However, a corresponding termination process in transition metal coordination polymerization of alpha-olefins is very rare due to the generally non-living nature of transition metal olefin catalysis. Only a few examples of living transition metal coordination polymerization have been reported, and those have been accomplished under very inconvenient reaction conditions and using specific catalysts [see Y. Doi, et al, *Makromol. Chem.*, 188, 1273, 1987; *Makromol. Chem.*, 186, 1825, 1985; *Makromol. Chem. Rapid Comm.*, 5, 811, 1984; and H. Yasuda, et al, *Macromolecules*, 25, 5115, 1992].

Several years ago, a new living catalyst system, based on late transition metals, e.g., cobalt (III) complex, was reported as being useful in the preparation of functional group-terminated polyethylene [see, M. Brookhart, et al, *Macromolecules*, 28, 5378, 1995]. The metal complex was first reacted with a phenyl group before initiating ethylene polymerization. In other words, the functional group was introduced into the beginning of polymer chain. To prevent the deactivation of the active site, the functional group had to be blocked from the electrophilic Co (III) during the polymerization. Overall, the catalyst activity was relatively low because each catalyst active site produced only one polymer chain. In addition, the polymer structure was limited to the branched polyethylene. To date, the applicants are unaware of any late transition metal catalyst that has been shown to incorporate alpha-olefins, such as propylene and 1-butene, with isotactic insertion into an olefin polymer backbone.

Another approach toward preparing functional group terminated polyolefin was via in situ chain transfer reaction to a co-initiator during Ziegler-Natta polymerization. Several Al-alkyl co-initiators [see, U.S. Pat. No. 5,939,495] and Zn-alkyl co-initiators [sere, Shiono et al., *Makromol. Chem.*, 193, 2751, 1992 and *Makromol. Chem. Phys.*, 195, 3303, 1994] were found to engage chain transfer reactions to obtain Al and Zn-terminated polyolefins, respectively. The Al and Zn-terminated polyolefins can be further modified to prepare polyolefins having other terminal functional groups. However, the products comprise a complex mixture of polymers containing various end groups, due to ill-defined catalyst systems that also involve other chain transfer reactions, such as β-hydride elimination and chain transfer to monomer.

Another method reported for the preparation of functional group terminated polyolefin is based on chemical modification of chain end unsaturated polypropylene (PP), which can be prepared by metallocene polymerization or thermal degradation of high molecular weight PP. [see Chung et al, *Macromolecules*, 32, 2525, 1999; *Macromolecules*, 31, 5943, 1998; *Polymer*, 38, 1495, 1997; Mulhaupt et al, *Polymers for Advanced Technologies*, 4, 439, 1993; and Shiono et al, *Macromolecules*, 25, 3356, 1992; *Macromolecules*, 26, 2085, 1993; *Macromolecules*, 30 5997, 1997]. The effectiveness of this chain end functionalization process is strongly dependent on (a) the percentage of polymer chains having a vinylidene terminal group and (b) the efficiency of functionalization reaction. It has been observed that the efficiency of the functionalization reaction decreases with an increase of PP molecular weight, due to the decrease of vinylidene concentration. Some functionalization reactions are very effective for low molecular weight PP. However, they become very ineffective for PP polymer having a molecular weight in excess of about 30,000 g/mole. Unfortunately, for many applications, such as for improving the interfacial interactions in PP blends and composites, a high molecular weight PP chain is essential. In addition, the availability of chain-end unsaturated polyolefins is very limited and most polyolefins, except polypropylene, have a low percentage of chain end unsaturation in their polymer chains.

In general, developments in homogeneous metallocene catalysis have provided a new era in polyolefin synthesis [see, e.g., U.S. Pat. No. 4,542,199; U.S. Pat. No. 4,530,914; U.S. Pat. No. 4,665,047; U.S. Pat. No. 4,752,597; U.S. Pat. No. 5,026,798 U.S. Pat. No. 5,272,236]. Thus, with well-designed, single-site catalysts having a constrained ligand geometry, the incorporation of higher alpha-olefins into a polymer chain has been greatly enhanced. This has significantly expanded the scope (composition and molecular structure) of polyolefin material, and has enabled the preparation of a variety of polymers having narrow molecular weight and composition distributions, including linear low density polyethylene (LLDPE), poly(ethylene-co-styrene) [see, e.g., U.S. Pat. No. 5,703,187], poly(ethylene-co-p-methylstyrene), poly(ethylene-ter-propylene-ter-p-methylstyrene) and poly(ethylene-ter-1-octene-ter-p-methylstyrene) [see, e.g., U.S. Pat. Nos. 5,543,484 and 5,866,659].

The narrow molecular weight and composition distributions of the metallocene-prepared polyolefins are the results of a well-defined polymerization mechanism, including initiation, propagation, termination, and chain transfer reactions. In recent years, Marks and Chung have applied the well-defined chain transfer reaction to terminate a propagating polyolefin chain with silane reagents [see Marks, T. J., J. Am. Chem. Soc., 120, 4019, 1998; J. Am. Chem. Soc., 117, 10747, 1995; Macromolecules, 32, 981, 1999] and with borane reagents [see Chung, T. C., J. Am. Chem. Soc., 121, 6764, 1999; Macromolecules, 32, 8689, 2000]. Several organosilanes having Si-H groups and several boranes having B-H groups have been shown to be effective chain transfer agents in metallocene-mediated polymerizations that result in silane-terminated and borane-terminated olefin polymers and copolymers, respectively. Hessen [Hessen et al., J. Am. Chem. Soc. 121, 6082, 1999] also studied C-H in thiophene as a chain transfer agent in ethylene polymerization using a neutral yttrium catalyst system. In general, the polymerization was extremely sluggish with very low catalyst activity. Kim [Kim S. Y. et al, Macromolecules, 33, 1921, 2000) also observed chain a transfer reaction in the copolymerization of ethylene and alkylbenzene. Unfortunately, the polymers produced showed many terminal structures, which were associated with various modes of chain transfer reactions.

SUMMARY OF THE INVENTION

In this invention, a new reactive (functional) group-terminated polyolefin is disclosed, in which the terminal group is a phenyl or substituted phenyl group. The general molecular structure of the present (functional) group-terminated polyolefin is illustrated below:

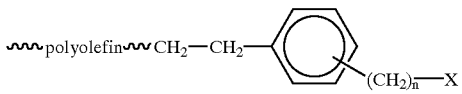

in which polyolefin is a homopolymer or copolymer prepared by metallocene-mediated coordination polymerization of alpha-olefins and/or diolefins, including $C_3$–$C_{18}$ monomers having linear, branched or cyclic structures, and in which the term "copolymer" is meant to include polymers containing groups or units derived from two or more monomers. Thus, as used in this specification and claims, the term "copolymer" is meant to include copolymers, terpolymers, tetrapolymers, etc. The molecular weight of polyolefin segment is above 500 g/mole. Preferably, the molecular weight is from about 10,000 to about 1,000,000 g/mole, and most preferably from about 30,000 to about 300,000 g/mole. The number of methylene spacer units (n) is from 0 to about 6, and preferably n is from 0 to 3. X is a group selected from H, Cl, Br, I, OH, $NH_2$, COOR, O—$BR_2$, O—$SiR_3$, $N(SiR_3)_2$, $BR_2$, $SiR_3$ (where R is a $C_1$ to $C_{10}$ linear, branched, cyclic or aromatic alkyl group), CH=$CH_2$, COOH, COOLi, and succinic anhydride.

The invention also relates to a polymerization process for producing olefin polymers containing a terminal phenyl or substituted phenyl group. The process involves simultaneously contacting $C_3$–$C_{18}$ alpha-olefin (or/and diolefin) monomers with styrene (or a styrene derivative) and with hydrogen under polymerization conditions in the presence of specific metallocene catalysts. Ironically, the metallocene catalysts contemplated for use in the present invention typically show poor styrene incorporation in copolymerization reactions between propylene and styrene. In many cases, the catalysts are deactivated after reacting with a styrene molecule. The deactivation of the catalyst apparently is due to the formation of a dormant active site after 2,1-insertion of styrene. The bulky phenyl side group adjacent to the active site may form a complex with the cationic active site, which blocks propylene (or higher α-olefins) 1,2-insertion. However, it has been found, quite unexpectedly, that the bulky active site reacts with hydrogen to release the polymer chain and to regenerate the active site for initiating a new polymer chain, as illustrated below:

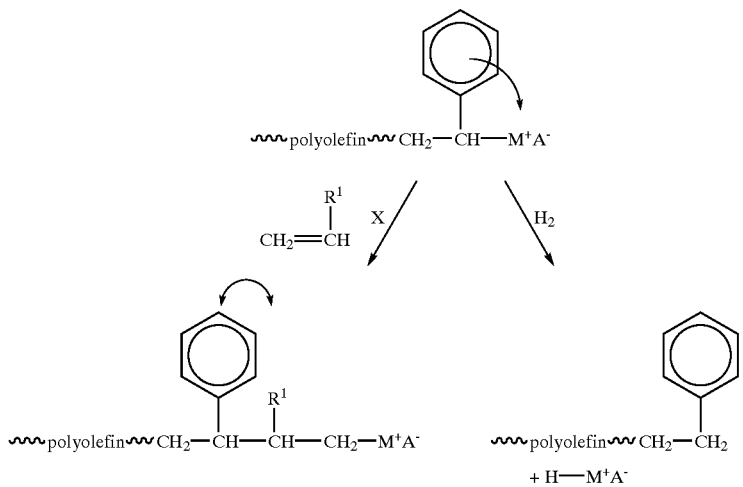

wherein, M is a transition metal of group IVB and VB metal, such as titanium, zirconium and haffium, which contains two bridged cyclopentadienyl or substituted cyclopentadienyl ligands having a covalent bridging group (such as silane, methyl and dimethyl groups). $A^-$ is a non-coordinating compatible anion. Particularly desirable are aluminoxane (MAO) and borate, including tetra(pentafluorophenyl)borate and methyltri(pentafluorophenyl)borate. $R^1$ is a $C_1$–$C_{10}$ alkyl group.

Overall, the polymerization process for producing polyolefin containing a terminal phenyl or substituted phenyl group resembles a sequential chain transfer reaction, first to styrene (or styrene derivative) and then to hydrogen, during the metallocene-mediated alpha-olefin polymerization. This process not only produces the polyolefin with a terminal pheniyl or substituted phenyl group, but also maintains high catalyst activity.

DETAILED DESCRIPTION

In accordance with the present invention, polyolefins containing a terminal phenyl or substituted phenyl group, sometimes referred to herein as polyolefins having a terminal styrene unit or styrene derivative unit, are prepared under generally conventional metallocene cation catalyzed polymerization conditions by polymerizing one or more $C_3$–$C_{18}$ olefin (or/and diolefin) monomers in the presence of both styrene (or a styrene derivative) and hydrogen as essential combined chain transfer agents, and in the further presence of herein-specified metallocene catalyst and co-catalyst systems.

It is essential to choose the metallocene catalyst, having a specific bridged cyclopentadienyl or substituted cyclopentadienyl structure, which can only react with one styrene (or styrene derivative) molecule, without further chain extension by incorporating either $C_3$–$C_{18}$ olefin or styrene (or styrene derivative) monomers. Therefore, the styrenic unit-terminated propagating polyolefin chain has the chance to react with hydrogen to complete the chain transfer reaction. To produce high yield of the styrenic unit terminated polyolefin, it is also important to choose the metallocene catalyst that shows very low undesirable chain transfer reactions to hydrogen, monomer, co-catalyst, and β-hydride elimination, during the $C_3$–$C_{18}$ olefin homopolymerizations.

This invention is based largely on the understanding that the deactivation of some specific metallocene active sites by styrenic molecules during some metallocene-mediated olefin polymerizations is due to the formation of a dormant species at the active site. After 2,1-insertion of styrenic molecule, the bulky electron-rich phenyl group is immediately adjacent to the electron-deficient cationic active site. The combination of steric hindrance and acid-base complexation, between the active site and phenyl group, prevents further olefin insertion with 1,2-manner. However, this dormant site is very reactive to hydrogen, such that a hydrogenation reaction releases the polymer chain (containing a terminal styrenic unit) and also regenerates the active site for further polymerization. In other words, according the reaction mechanism described in this invention, the polymer formed has a terminal styrenic unit, and the polymer molecular weight is proportional to the [olefin]/[styrenic molecule] ratio. The overall polymerization rate maintains very high, similar to that of the reaction between only the olefin (or/and diolefin) monomers, without any styrene and hydrogen chain transfer agents being present in the reaction mass.

The reaction mechanism of forming the styrenic unit-terminated polyolefin may be further exemplified by the polymerization of propylene using rac-Me$_2$Si[2-Me-4-Ph(Ind)]$_2$ZrCl$_2$/MAO catalyst system in the presence of p-methylstyrene (p-MS) and hydrogen chain transfer agents, as illustrated below:

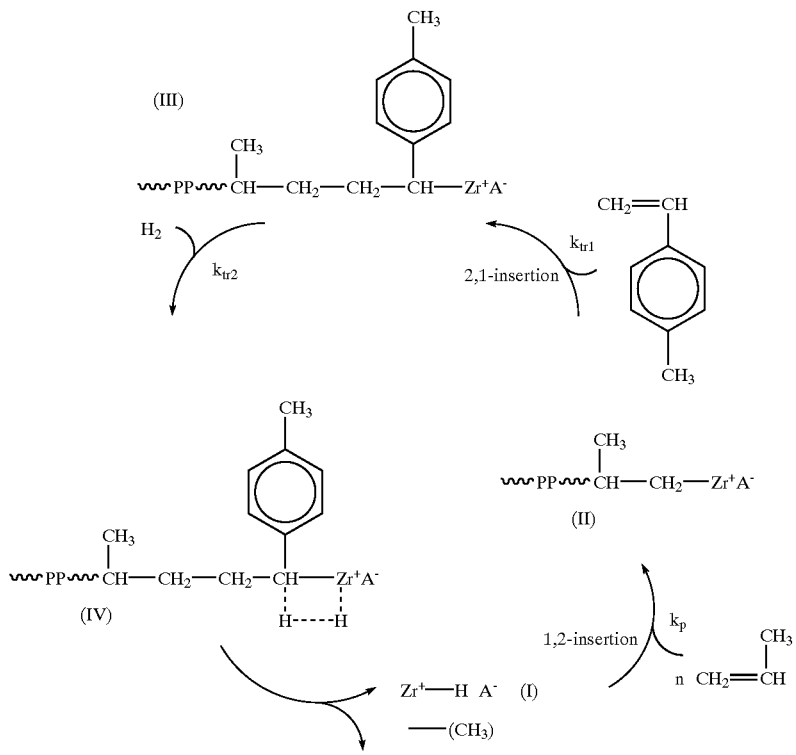

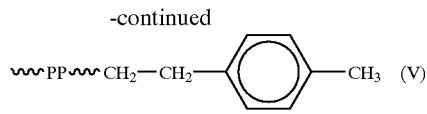

During the polymerization of propylene (with 1,2-insertion manner) the propagation Zr—C site (II) can also react with p-methylstyrene (with 2,1 -insertion manner) to form p-methylstyrene terminated polypropylene (III). The catalytic Zr—C site in compound (III) becomes inactive to both propylene and p-methylstyrene [see Chung et al., *J. Polymer Science: Part A: Polymer Chemistry*, 37, 2795, 1999] due to the combination of steric hindrance between the active site (Zr—C) and incoming monomer (propylene with 1,2-insertion) and the formation of complex between the adjacent phenyl group and the $Zr^+$ ion. On the other hand, with the presence of hydrogen, the dormant Zr—C site (III) can react with hydrogen to form p-methylstyrene-terminated polypropylene (PP-t-p-MS) (V) and regenerate Zr—H species (I) that is capable of reinitiating the polymerization of propylene and, thus, continuing polymerization cycle. In other words, the ideal chain transfer reaction will not significantly effect the rate of polymerization, but will reduce the molecular weight of the resulting polymer. The molecular weight of PP-t-p-MS is almost linearly proportional to the molar ratio of [propylene]/[p-MS], and is basically independent of the molar ratio of [propylene]/[hydrogen]. Accordingly, it is clear that the chain transfer reaction with p-MS (rate constant $k_{tr}$) is the dominant termination process, which competes with the propagating reaction with propylene (rate constant $k_p$). The degree of polymerization $(X_n)$ follows a simple comparative equation $X_n = k_p[\text{propylene}]/k_{tr}[\text{p-MS}]$, with a chain transfer constant of $k_{tr}/k_p \sim 1/6.36$.

In accordance with this invention, this sequential chain transfer reaction, first to styrene (or styrene derivative) and then hydrogen, during the metallocene-mediated olefin polymerization, can be applied to any $C_3$–$C_{18}$ olefin and diolefin monomers without causing undesirable side reactions, such as the copolymerization of olefin (or/and diolefin) with styrene (or styrene derivatives), or several direct chain transfer reactions from the propagating olefinic chain end to hydrogen, monomer or co-initiator, as well as β-hydride elimination, as discussed above. The molecular weight of the styrenic unit-terminated polyolefin is basically controlled by the mole ratio of [olefinic monomer]/[styrenic molecule], and the general molecular structure of styrenic-unit-terminated polymer (polyolefin containing a terminal phenyl or substituted phenyl group) is illustrated below:

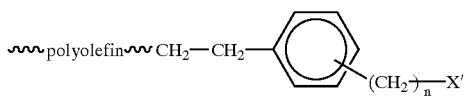

wherein polyolefin is a homopolymer or copolymer prepared by metallocene-mediated coordination polymerization of linear, branched or cyclic $C_3$–$C_{18}$ alpha-olefins and/or diolefins. The molecular weight of polyolefin segment is above 500 g/mole, preferably from about 10,000 to about 1,000,000 g/mole, and most preferably from about 30,000 to about 300,000 g/mole. The number of methylene spacer units (n) is 0 and about 6, and preferably n is 0 to 3. X' is a group selected from H, Cl, Br, I, COOR, O—$BR_2$, O—$SiR_3$, $N(SiR_3)_2$, $BR_2$, $SiR_3$ (where R is a $C_1$ to $C_{10}$ linear, branched, cyclic or aromatic alkyl group) and $CH=CH_2$.

As used in this specification and claims, the term "aliphatic alkyl group" is meant to include $C_1$ to $C_{10}$ linear, branched or cyclic aliphatic groups such as —$CH_2CH(CH_3)$ $CH_3$, —$CH_3$, —$CH_2CH_3$ and the like. The term "aromatic alkyl group" is meant to include groups such as $\Phi(R')_y$, where $\Phi$ is phenyl, R' is $C_1$ to $C_5$ linear or branched alkyl, and y is 1, 2 or 3, and preferably 1. Preferred examples of $\Phi(R')_y$, include $\Phi$-$CH_3$ and $\Phi$-$CH_2CH_3$ (where $\Phi$ is phenyl).

The metallocene catalysts capable of producing the present styrenic group-terminated polyolefin, via olefin polymerization-chain transfer reaction to styrene/hydrogen, is the one having minimum copolymerization capability between olefinic and styrenic monomers and showing very low direct chain transfer reaction between the propagating olefinic polymer chain end and hydrogen. Suitable catalysts, which typically produce a homopolymer having a very high molecular weight, may be illustrated by the following formula:

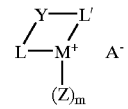

where M is a transition metal of group III and IV of the Periodic Table of the Elements, L and L', independently, are cyclopentadienyl or substituted cyclopentadienyl groups bound in an $\eta^5$ bonding mode to metal, Y is a moiety selected from —$SiR'_2$—, —$CR'_2$—, and —$CR'_2$—$CR'_2$—, where each R', independently, is selected from the group consisting of hydrogen, alkyl, aryl, silyl, halogenated alkyl, halogenated aryl, and mixtures thereof, Z is selected from hydride, halo, alkyl, aryl, aryloxy, and alkoxy, m is 0 or 1, and $A^-$ is a non-coordinating, compatible anion derived from, for example, an aluminoxane, such as methylaluminoxane (MAO), or a borate, such as tetra(pentafluorophenyl) borate and methyltri(pentafluorophenyl)borate.

One known method of making the ionic catalyst species useful in this invention involves combining (a) a transition metal compound and (b) a compound capable of reacting with a transition metal compound to form an ionic complex. In the reaction of compounds (a) and (b), the compound (a) forms a cation formally having a coordination number that is one less than its valence, and the compound (b) becomes a non-coordinating, compatible anion. The amount of such transition metal compound employed generally will range from about 20 ppm to about 1 wt. %, and preferably from about 0.001 to about 0.2 wt. %, based upon the total amount of monomer to be polymerized therewith.

The preferred olefin and diolefin monomers that are used to prepare the polyolefin backbone of the present styrenic-group-terminated polyolefins include propylene, 1-butene, 1-pentene, 1-hexene, 1-octene, 3-methyl-1-butene, 4-methyl-1-pentene, cyclopentene, norbornene, phenylnorbornene, indanylnorbornene, 1,4-hexadiene, 1,5-hexadiene, and vinylidenenorborene. These monomers can be used either singly or as a combination of two or more monomers. The resulting polyolefin stereo-structure can be anyone of the five types of tacticity known for polyolefins, namely: atactic, syndiotactic, isotactic, hemiisotactic and isotactic stereoblock, which are very much controlled by the catalyst used.

The styrenic chain transfer agents contemplated for use in the present invention include styrene and styrene derivatives containing a substituent that is stable to the active site under the polymerization conditions. The styrenic chain transfer agents may be illustrated by the following structural formula:

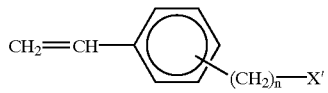

wherein n is from 0 to about 6, and most preferably from 0 to about 3, and X' is a group selected from H, Cl, Br, I, COOR, O—BR$_2$, O—SiR$_3$, N(SiR$_3$)$_2$, BR$_2$, SiR$_3$ (where R is a C$_1$ to C$_{10}$ linear, branched or cyclic aliphatic alkyl group or aromatic alkyl group) and CH=CH$_2$.

The polymerization reaction may be carried out under the conditions similar to those in conventional metallocene polymerizations. In particular, the polymerization may be carried out under batch conditions, such as in an inert gas atmosphere and the substantial absence of moisture. Preferably the polymerization is carried out continuously in a typical continuous polymerization process with inlet pipes for monomers, catalysts and diluents, temperature sensing means and an effluent overflow to a holding drum or quench tank. In solution and dispersion polymerization processes where an inert diluent is used, a hydrocarbon solvent such as hexane, heptalne, cyclohexanie, toluene, xylene, or the like, can be used. The polymerization temperature for such processes typically would range from about 10 to 800° C., preferably from about 25 to 70° C. The overall residence time can vary, depending upon, e. g., catalyst activity and concentration, monomer concentration, reaction temperature, monomer conversion and desired molecular weight, and generally will be between about thirty minutes and five hours, and preferably between about 1 and 2 hours. Typically, the resulting styrenic unit-terminated polyolefins would be weighed and subjected to NMR, DSC and GPC analysis to determine their polymer structure, thermal transition temperature, molecular weight, and molecular weight distribution, respectively.

One major objective of this invention is to prepare polyolefin having a terminal functional group that can serve as a reactive site for coupling reactions or as an initiator for polymerization processes that produce polyolefin diblock copolymers. Some of the protected functional end groups, such as COOR, O—SiR$_3$ and N(SiR$_3$)$_2$, used during the polymerization can be de-protected by HCl to recover COOH, OH and NH$_2$ terminal group, respectively. On the other hand, the benzylic alkyl or alkenyl groups, such as Φ-CH$_3$ and Φ-CH=CH$_2$, respectively, are very reactive in many chemical reactions, including free radical, cationic and anionic processes [see U.S. Pat. Nos. 5,543,484; 5,866,659; 6,015,862; and 6,096,849]. For example, both groups can be metallated easily with butyl lithium to form a benzylic anion at the polyolefin chain end, which can then carry out living anionic polymerization of styrene and methyl methacrylate to produce polyolefin diblock copolymers. Overall, the subsequent derivatization reactions widely broaden the polyolefin composition and structures.

The following examples are illustrative of the principles and practice of this invention, although not limited thereto.

EXAMPLE 1

Synthesis of Styrene Unit-terminated PP by The Combination of rac-Me$_2$Si[2-Me-4-Ph(Ind)]$_2$ZrCl$_2$/ MAO Catalyst and Styrene/H$_2$ Chain Transfer Agent In a dry box, 50 ml of toluene and 1.5 ml of MAO (30 wt % in toluene) were charged into a pair 450 ml stainless auto Clave equipped with a mechanical stifner. After removal from the box, the reactor was purged with hydrogen (20 psi) before injecting 0.2 g (0.0346 M) of styrene. The reactor was then charged with 100 psi propylene to saturate the toluene solution at ambient temperature and to increase the total pressure in the reactor to 120 psi. About 1.25×10$^{-6}$ mole of rac-Me$_2$Si[2-Me-4-Ph(Ind)]$_2$ZrCl$_2$ in toluene solution was then syringed into the reactor, under rapid stirring, to initiate the polymerization. Additional propylene was fed continuously into the reactor to maintain a constant pressure (120 psi) during the entire course of the polymerization. To minimize mass-transfer and to maintain the constant feed ratio, the polymerization was carried out with rapid mixing and a short reaction time. After a 15 minutes reaction time at 30° C., the polymer solution was quenched with methanol. The resulting styrene unit-terminated polypropylene (PP-t-S) was washed with tetrahydrofuran (THF) to remove excess styrene, and then vacuum-dried at 50° C. About 23.18 g of PP-t-S polymer was obtained with a catalytic activity of 74,176 kg of PP/mol of Zr.h. The PP-t-S polymer was analyzed by $^1$H NMR, by $^{13}$C NMR, by Gel Permeation Chromatography (GPC) and by Differential Scanning Calorimetry (DSC) techniques. The molecular weight and molecular weight distribution of the PP-t-S polymer were determined by GPC using a Waters 150C apparatus with an index refractometer (IR) detector and a set of μ-Styragel HT columns of 10$^6$, 10$^5$, 10$^4$ and 10$^3$ angstrom pore size in series. The measurements were operated at 140° C. using 1,2,4-trichlorobenzene (TCB) as solvent and mobile phase with a flow rate of 0.7 ml/min. Narrow molecular weight polyethylene samples were used as standards. The $^1$H and $^{13}$C NMR studies were recorded on a Bruker AM-300 spectrometer with DISNMR software. The measurements were made at 110° C. using C$_2$D$_2$Cl$_4$ as the solvent containing 1% TMS (Me$_4$Si (δ=0.00 ppm)) as an external standard. Differential Scanning Calorimetry (DSC) was measured on a Perkin Elmer DSC-7 instrument controller. The DSC curves were recorded in the second heating cycle with a heating rate of 20 ° C./min. The results of these analyses are set forth below in Table 2.

The in situ chain transfer to styrene/hydrogen during the metallocene-catalyzed polymerization of propylene is also evidenced by the comparison with several control reactions that were carried out under similar reaction conditions, using the same catalyst and propylene concentration, but without hydrogen and with or without styrene. The experimental results are compared in Table 1.

TABLE 1

Comparison of the experimental results in the rac-Me$_2$Si[2-Me-4-Ph(Ind)]$_2$ZrCl$_2$/MAO catalyzed polymerization[a] of propylene.

| Example | Styrene (M) | H$_2$ (psi) | Yield (g) | Cat. Activity[b] | Styrene in PP (mole %) | Styrene Conversion (%) | Mn (× 10$^{-3}$) | PDI (Mw/Mn) |
|---|---|---|---|---|---|---|---|---|
| 1 | 0.0346 | 20 | 23.18 | 74,176 | 0.11 | 35.10 | 53,400 | 2.0 |
| Control 1 | 0 | 0 | 26.94 | 86,208 | 0 | — | 77,600 | 2.9 |
| Control 2 | 0.0173 | 0 | 0.249 | 797 | 0.11 | 0.54 | 60,400 | 3.3 |
| Control 3 | 0.0865 | 0 | ~0 | ~0 | — | 0 | — | — |

[a]reaction conditions: 50 ml toluene, propylene (100 psi), [Zr] = 1.25 × 10$^{-6}$ mol/l, [MAO]/[Zr] = 3000, temperature = 30° C., time = 15 min.
[b]catalyst activity = kg of PP/mol of catalyst.h.

Styrene in control runs 2 and 3 effectively stops the polymerization of propylene in rac-Me$_2$Si[2-Me-4-Ph(Ind)]$_2$ZrCl$_2$/MAO catalyzed reactions. The introduction of hydrogen (Example 1) restores the catalyst activity, similar to that of homopolymerization of propylene (Control 1). Hydrogen is clearly needed to complete the chain transfer cycle during the polymerization.

EXAMPLES 2–5

Synthesis of Styrene unit-terminated PP by The Combination of rac-Me$_2$Si[2-Me-4-Ph(Ind)]$_2$ZrCl$_2$/MAO Catalyst and Styrene/H$_2$ Chain Transfer Agent In a series of examples, a systematic study was conducted to evaluate the effect of styrene concentration (with constant propylene and hydrogen concentrations) on the catalyst activity and molecular weight of styrene unit-terminated PP polymers. Each experiment was carried out using the reaction procedures and condition described in Example 1, i.e. hydrogen (20 psi), propylene (100 psi), and rac-Me$_2$Si[2-Me-4-Ph(Ind)]$_2$ZrCl$_2$ (1.25×10$^{-6}$ mol,l) catalyst in toluene solution with [MAO]/[Zr]=3000. Styrene concentration was varied in each example, as indicated in Table 2. The molecular weight, molecular weight distribution and structure of the resulting PP-t-S polymers were determined by GPC and $^1$H NMR, respectively.

Comparing Examples 1–5, the polymer molecular weight was almost linearly proportional to the molar ratio of [propylene]/[styrene]; and polymers having a molecular weight as low as several thousand (Example 5) and as high as about 75,000 (Example 1) were prepared. $^1$H NMR spectra of PP-t-S (Mn=1800) identified the polymer chain end with chemical shifts at 2.7 and 7.2–7.4 ppm for —CH$_2$—C$_6$H$_5$ and —CH$_2$—C$_6$H$_5$, respectively. The same results were also observed in the $^{13}$C NMR spectra, which showed both polymer chain ends, —CH$_2$—C$_6$H$_5$ ($\delta$36.4) and —CH$_3$ ($\delta$14.3) groups. It is interesting to note that there was no detectable vinyl group associated with the conventional chain transfer process (via β-H elimination). It is clear that the chain transfer reaction to styrene (with rate constant $k_{tr}$) is the dominant termination process, which competes with the propagating reaction (with rate constant $k_p$). The degree of polymerization ($X_n$) follows a simple comparative equation $X_n=k_p$[propylene]/$k_{tr}$[styrene] with a chain transfer constant $k_{tr}/k_p$~1/7.5.

EXAMPLES 6–11

Synthesis of Styrene Unit-terminated PP by The Combination of rac-Me$_2$Si[2-Me-4-Ph(Ind)]$_2$ZrCl$_2$/MAO Catalyst and Styrene/H$_2$ Chain Transfer Agent A systematic study was conducted to determine the effect of hydrogen concentration on catalyst activity and molecular weight of styrene unit-tenninated PP polymers. For the study, each of Example 6–11 was carried out using the reaction conditions and procedures described in Example 1. The results of Examples 6–11 are compared with the results of Examples 1, 2 and 4 in Table 3.

TABLE 2

A summary of PP-t-S polymers prepared by rac-Me$_2$Si[2-Me-4-Ph(Ind)]$_2$ZrCl$_2$/MAO mediated polymerization[a] of propylene in the presence of styrene/hydrogen chain transfer agents.

| Example | Styrene (M) | Yield (g) | Cat. Activity[b] | Styrene in PP (mol %) | Styrene Conversion (%) | M$_n$ (× 10$^{-3}$) | PDI (Mw/Mn) |
|---|---|---|---|---|---|---|---|
| 1 | 0.0346 | 23.18 | 74,176 | 0.11 | 35.1 | 53.4 | 2.0 |
| 2 | 0.0865 | 8.91 | 28,512 | 0.33 | 16.9 | 26.1 | 1.7 |
| 3 | 0.173 | 3.82 | 12,224 | 0.77 | 8.1 | 9.8 | 1.6 |
| 4 | 0.346 | 2.10 | 6,720 | 1.45 | 4.1 | 4.6 | 1.5 |
| 5 | 0.519 | 1.04 | 3,328 | 2.11 | 2.0 | 1.8 | 1.5 |

[a]reaction conditions: 50 ml toluene, H$_2$ (20 psi), propylene (100 psi), [Zr] = 1.25 × 10$^{-6}$ mol/l, [MAO]/[Zr] = 3000, temperature = 30° C., time = 15 min.
[b]catalyst activity = kg of PP/mol of catalyst.h).

TABLE 3

A summary of PP-t-S polymers prepared by rac-Me$_2$Si[2-Me-4-Ph(Ind)]$_2$ZrCl$_2$/MAO mediated polymerization[a] of propylene in the presence of styrene/hydrogen chain transfer agents.

| Example | Styrene (M) | Hydrogen (psi) | Cat. Activity[b] | Styrene in PP (mol %) | Styrene Conversion (%) | $M_n$ (× 10$^{-3}$) | PDI (Mw/Mn) |
|---|---|---|---|---|---|---|---|
| 1  | 0.0346 | 20 | 74,176 | 0.11 | 35.10 | 53.4 | 2.0 |
| 6  | 0.0346 | 6  | 27,392 | 0.12 | 14.14 | 55.2 | 2.1 |
| 7  | 0.0346 | 2  | 15,648 | 0.12 | 8.08  | 54.8 | 2.2 |
| 2  | 0.0865 | 20 | 28,512 | 0.33 | 16.68 | 26.1 | 1.7 |
| 8  | 0.0865 | 12 | 15,008 | 0.33 | 8.78  | 25.9 | 1.7 |
| 9  | 0.0865 | 6  | 9,216  | 0.34 | 5.39  | 25.3 | 1.7 |
| 10 | 0.346  | 35 | 11,392 | 1.41 | 6.97  | 4.6  | 1.5 |
| 4  | 0.346  | 20 | 6,720  | 1.45 | 4.11  | 4.6  | 1.5 |
| 11 | 0.346  | 12 | 2,848  | 1.42 | 1.74  | 4.7  | 1.6 |

[a]reaction conditions: 50 ml toluene, propylene (100 psi), [Zr] = 1.25 × 10$^{-6}$ mol/l, [MAO]/[Zr] = 3000, temperature = 30° C., time = 15 min.
[b]catalyst activity = kg of PP/mol of catalyst.h).

All three comparative reaction sets, including (i) Examples 1, 6, 7, (ii) Examples 2, 8, 9, and (iii) Examples 10, 4, 11, show the same trend. As opposed to styrene chain transfer agent concentration, which has a significant bearing on the molecular weight of the resulting polymer, it has been found that a change in the hydrogen concentration does not have any significant effect on the molecular weight and molecular weight distribution of the resulting polymers. Therefore, it is clear that hydrogen does not engage in the initial chain transfer reaction. Rather, the hydrogen plays an "assistance role" to complete the reaction cycle. The data in Table 3 also shows that as the styrene concentration increases, an increased amount of hydrogen is needed to maintain high catalyst activity and styrene conversion.

EXAMPLES 12–16

Synthesis of Styrene Unit-terminated PP by The Combination of rac-Et(Ind)]$_2$ZrCl$_2$/MAO Catalyst and Styrene/H$_2$ Chain Transfer Agent A systematic study also was conducted for rac-Et(Ind)]$_2$ZrCl$_2$/MAO mediated propylene polymerization. For the study, each of Examples 12–16 was carried out using the reaction procedures and condition described in Example 1, i.e. hydrogen (20 psi), propylene (100 psi), and rac-Et(Ind)]$_2$ZrCl$_2$MAO (1.25×10$^{-6}$ moll) catalyst in toluene solution with [MAO]/[Zr]=3000. Each of the control reactions was carried out without the use of hydrogen. The molecular weight, molecular weight distribution, and structure of the resulting PP-t-S polymers were determined by GPC and $^1$H NMR, respectively. Table 4 compares the effect of styrene concentration (with constant propylene and hydrogen concentrations) to the catalyst activity and molecular weight of styrene-terminated PP polymers.

TABLE 4

A summary of PP-t-S polymers prepared by rac-Et(Ind)]$_2$ZrCl$_2$/MAO and styrene/hydrogen chain transfer agents.

| Example | Styrene (M) | Hydrogen (psi) | Cat. Activity[b] | Styrene in PP (mol %) | Styrene Conversion (%) | $M_n$ (× 10$^{-3}$) | PDI (Mw/Mn) |
|---|---|---|---|---|---|---|---|
| control 4 | 0     | 0  | 58,880 | 0     | 0    | 46.3 | 1.8 |
| control 5 | 0.260 | 0  | 195    | 0.18  | 0.02 | 30.9 | 2.7 |
| control 6 | 0.519 | 0  | ~0     | —     | ~0   | —    | —   |
| 12 | 0.086 | 20 | 57,704 | 0.063 | 5.75 | 33.5 | 1.8 |
| 13 | 0.260 | 20 | 40,352 | 0.18  | 4.16 | 23.5 | 1.8 |
| 14 | 0.519 | 20 | 20,288 | 0.30  | 1.75 | 19.5 | 1.6 |
| 15 | 0.865 | 20 | 12,928 | 0.46  | 1.02 | 16.9 | 1.8 |
| 16 | 1.298 | 20 | 2,880  | 0.87  | 0.29 | 10.6 | 1.8 |

[a]reaction conditions: 50 ml toluene, propylene (100 psi), [Zr] = 1.25 × 10$^{-6}$ mol/l, [MAO]/[Zr] = 3000, temperature = 30° C., time = 15 min.
[b]catalyst activity = kg of PP/mol of catalyst.h).

The data in Table 4 relative to the Control runs 4–6, indicates that styrene effectively stops the polymerization of propylene. The introduction of hydrogen (Examples 12–16) restores the catalyst activity, similar to that of the homopolymerization of propylene (Control run 1). Hydrogen is needed to complete the chain transfer cycle during the polymerization. Comparing the results of Examples 12–16, the polymer molecular weight is also linearly proportional to the molar ratio of [propylene]/[styrene]. It is clear that the chain transfer reaction to styrene (with rate constant $k_{tr}$) is the dominant termination process, which competes with the propagating reaction (with rate constant $k_p$). The degree of polymerization ($X_n$) follows a simple comparative equation $X_n = k_p[\text{propylene}]/k_{tr}[\text{styrene}]$ with a chain transfer constant $k_{tr}/k_p \sim 1/48.6$.

EXAMPLES 17–20

Synthesis of p-Methylstyrene Unit-terminated PP by The Combination of rac-Me$_2$Si[2-Me-4-Ph(Ind)]$_2$ZrCl$_2$/MAO Catalyst and p-MS/H$_2$ Chain Transfer Agent In a dry box, 50 ml of toluene and 1.5 ml of MAO (30 wt % in toluene) were charged into a parr 450 ml stainless auto Clave equipped with a mechanical stirrer. After removal from the box, the reactor was purged with hydrogen at the pressure for each example as indicated in Table 5, before injecting the reactor with 0.2 g (0.0305 M) of p-methylstyrene. The reactor was then charged with 100 psi propylene to saturate the solution at ambient temperature. About 1.25×10$^{-6}$ mole of rac-Me$_2$Si[2-Me-4-Ph(Ind)]$_2$ZrCl$_2$ in toluene solution was then syringed into the solution with rapid stirring under propylene pressure to initiate the polymerization. Additional propylene was fed continuously into the reactor to maintain a constant pressure during the entire course of the polymerization. To minimize mass-transfer and to maintain the constant feed ratio, the reactions were carried out with rapid mixing and a short reaction time. After 15 minutes reaction time at 30° C., the polymer solution was quenched with methanol. The resulting p-methylstyrene unit-terminated polypropylene (PP-t-p-MS) was washed with THF to remove excess styrene and then vacuum-dried at 50° C. The PP-t-p-MS polymer obtained in each example was analyzed by $^1$H NMR, $^{13}$C NMR and GPC techniques. The results observed with Examples 17–20 are set forth in Table 5, along with the results observed with two control runs (Control 7 and Control 8), which were carried out under similar reaction procedures and conditions, except that Control 7 was run with neither hydrogen nor p-methylstyrene present in the reaction mixture, and Control 8 was run without hydrogen, but with p-methylstyrene in the reaction mixture.

Comparing the results of Control 7 with those of Control 8, a noticeable decrease in catalyst activity is observed. Clearly, the presence of p-Methylstyrenie in the reaction mixture resulted in the deactivation of rac-Me$_2$Si[2-Me-4-Ph(Ind)]$_2$ZrCl$_2$/MAO catalyst in the polymerization of propylene. The presence of hydrogen (in Examples 17–20) restored the catalyst activity and completed the chain transfer cycle during the polymerization. In Example 20, with the hydrogen pressure of 35 psi, the catalyst activity was almost the same as that of the homopolymerization of propylene (Control 7). However, the reduction in molecular weight (Mn~34,600), when comparing Example 20 with Examples 17–19, may be associated with the direct chain transfer reaction from the propagating PP chain to hydrogen.

EXAMPLES 21–29

Synthesis of p-Methylstyrene Unit-terminated PP by The Combination of rac-Me$_2$Si[2-Me-4-Ph(Ind)]$_2$ZrCl$_2$/MAO Catalyst and p-MS/H$_2$ Chain Transfer Agent In a series of Examples, a systematic study was conducted to further evaluate the effect of hydrogen and p-methylstyrene concentrations on the catalyst activity and polymer molecular weight. In these examples, the procedure of Examples 17–20 was followed, except that the concentrations of p-methylstyrene and hydrogen were as set forth in Table 6. Table 6 summarizes the results for Examples 21–29, as well as for several control runs (Controls 9–12).

As set forth in Table 6, all four control runs show that hydrogen is necessary to complete the chain transfer reaction to p-methylstyrene during the rac-Me$_2$Si[2-Me-4-Ph(Ind)]$_2$ZrCl$_2$/MAO mediated polymerization of propylene. In general, the change of hydrogen concentration does not have any significant effect on the molecular weight and molecular weight distribution of the resulting p-MS unit-terminated polypropylene polymers. A sufficient quantity of hydrogen, increasing with the increased of p-MS concentration, is needed to maintain high catalyst activity and p-MS conversion.

TABLE 5

Comparison of the experimental results in the rac-Me$_2$Si[2-Me-4-Ph(Ind)]$_2$ZrCl$_2$/MAO catalyzed polymerization[a] of propylene with p-MS/hydrogen chain transfer agents.

| Example | p-MS (M) | H$_2$ (psi) | Yield (g) | Cat. Activity[b] | p-MS in PP (mole %) | p-MS Conversion (%) | Mn (× 10$^{-3}$) | PDI (Mw/Mn) |
|---|---|---|---|---|---|---|---|---|
| Control 7 | 0 | 0 | 26.94 | 86,208 | 0 | — | 77,600 | 2.9 |
| Control 8 | 0.0305 | 0 | 0.051 | 163 | 0.16 | 0.05 | 59,700 | 3.4 |
| 17 | 0.0305 | 2 | 3.80 | 12,160 | 0.14 | 8.30 | 55,500 | 1.9 |
| 18 | 0.0305 | 6 | 8.04 | 25,728 | 0.15 | 18.83 | 54,800 | 2.0 |
| 19 | 0.0305 | 12 | 12.04 | 38,528 | 0.15 | 28.19 | 55,400 | 1.9 |
| 20 | 0.0305 | 35 | 24.67 | 78,944 | 0.13 | 50.05 | 34,600 | 2.8 |

[a]reaction conditions: 50 ml toluene, propylene (100 psi), [Zr] = 1.25 × 10$^{-6}$ mol/l, [MAO]/[Zr] = 3000, temperature = 30° C., time = 15 min.
[b]catalyst activity = kg of PP/mol of catalyst.h.

TABLE 6

A summary of PP-t-p-MS polymers prepared[a] by the combination of rac-Me$_2$Si[2-Me-4-Ph(Ind)]$_2$ZrCl$_2$/MAO catalyst and p-MS/hydrogen chain transfer agents.

| Example | p-MS (M) | H$_2$ (psi) | Yield (g) | Cat. Activity[b] | p-MS in PP (mole %) | p-MS Conversion (%) | Mn (× 10$^{-3}$) | PDI (Mw/Mn) |
|---|---|---|---|---|---|---|---|---|
| Control 9 | 0.076 | 0 | ~0 | — | — | — | — | — |
| 21 | 0.076 | 6 | 0.91 | 2,912 | 0.40 | 2.33 | 27,600 | 2.1 |
| 22 | 0.076 | 12 | 1.69 | 5,408 | 0.41 | 4.33 | 25,900 | 2.3 |
| 23 | 0.076 | 20 | 8.81 | 28,192 | 0.43 | 23.65 | 20,500 | 2.4 |
| 24 | 0.076 | 35 | 10.52 | 33,664 | 0.41 | 26.86 | 25,800 | 2.3 |
| Control 1 | 0.153 | 0 | ~0 | — | — | — | — | — |
| 25 | 0.153 | 12 | 0.35 | 1,120 | 0.66 | 0.72 | 10,000 | 2.3 |
| 26 | 0.153 | 20 | 3.81 | 12,192 | 0.61 | 7.26 | 11,700 | 2.0 |
| 27 | 0.153 | 35 | 4.41 | 14,112 | 0.63 | 8.67 | 9,700 | 1.9 |
| Control 1 | 0.305 | 0 | ~0 | — | — | — | — | — |
| 28 | 0.305 | 35 | 2.10 | 6,720 | 1.43 | 4.69 | 4,600 | 1.7 |
| Control 1 | 0.458 | 0 | ~0 | — | — | — | — | — |
| 29 | 0.458 | 35 | 0.91 | 2,912 | 2.16 | 2.05 | 1,800 | 1.4 |

[a]reaction conditions: 50 ml toluene, propylene (100 psi), [Zr] = 1.25 × 10$^{-6}$ mol/l, [MAO]/[Zr] = 3000, temperature = 30° C., time = 15 min.
[b]catalyst activity = kg of PP/mol of catalyst.h.

Comparing the four reaction sets (Control 9—Example 24, Control 10 —Example 27, Controll 11 —Example 28 and Control 12 —Example 29), it is clear that the polymer molecular weight is generally linearly proportional to the molar ratio of [propylene]/[p-MS]. It also is clear that under most reaction conditions the chain transfer reaction to p-MS (with rate constant k$_{tr}$) is the dominant termination process, which competes with the propagating reaction of propylene (with rate constant k$_p$). The degree of polymerization (X$_n$) follows a simple comparative equation X$_n$=k$_p$[propylene]/k$_{tr}$[styrene] with a chain transfer constant k$_{tr}$/k$_p$~1/6.36. In $^1$H NMR spectra of PP-p-MS (Mn=4600), in addition to the peaks between 0.9 and 1.7 ppm, corresponding to protons in PP chain, there are peaks at 2.7, 7.1, and 2.35 ppm, corresponding to —CH$_2$, —C$_6$H$_5$ and CH$_3$, respectively, at the polymer chain end.

chain transfer agents. A systematic study was conducted to evaluate the effects of hydrogen and p-Cl-St concentrations on the catalyst activity and polymer molecular weight. For each of Examples 30–33, the procedure of Examples 17–20 was followed, except that the p-chlorostyrene was charged. Table 7 summarizes the experimental results, which are also compared with several control runs (Controls 13–15) in which the polymerization reactions were performed by the same procedure as for Examples 30–33, but in the absence of hydrogen.

TABLE 7

A summary of PP-t-p-Cl-St polymers prepared[a] by the combination of rac-Me$_2$Si[2-Me-4-Ph(Ind)]$_2$ZrCl$_2$/MAO catalyst and p-Cl-St/hydrogen chain transfer agents.

| Example | p-Cl-St (M) | H$_2$ (psi) | Yield (g) | Cat. Activity[b] | p-Cl-St in PP (mole %) | Mn (× 10$^{-3}$) | PDI (Mw/Mn) |
|---|---|---|---|---|---|---|---|
| Control 13 | 0.144 | 0 | 0.11 | 352 | 0.12 | 54,600 | 1.9 |
| 30 | 0.144 | 6 | 1.36 | 4,402 | 0.13 | 45,300 | 1.9 |
| 31 | 0.144 | 20 | 7.56 | 24,192 | 0.12 | 46,100 | 2.1 |
| Control 14 | 0.289 | 0 | ~0 | ~0 | — | — | — |
| 32 | 0.289 | 20 | 4.44 | 15,712 | 0.24 | 18,700 | 2.1 |
| Control 15 | 0.433 | 0 | ~0 | ~0 | — | — | — |
| 33 | 0.433 | 27 | 8.48 | 27,200 | 0.39 | 8,200 | 1.9 |

[a]reaction conditions: 50 ml toluene, propylene (100 psi), [Zr] = 1.25 × 10$^{-6}$ mol/l, [MAO]/[Zr] = 3000, temperature = 30° C., time = 15 min.
[b]catalyst activity = kg of PP/mol of catalyst.h.

EXAMPLES 30–33

Synthesis of p-Chlorostyrene Unit-terminated PP by The Combination of c-Me$_2$Si[2-Me-4-Ph(Ind)]$_2$ZrC$_2$/MAO Catalyst and p-Cl-St/H$_2$ Chain Transfer Agent In a series of Examples, several p-chlorostyrene unit-terminated PP (PP-t-p-Cl-St) polymers were prepared by using rac-Me$_2$Si[2-Me-4-Ph(Ind)]$_2$ZrCl$_2$/MAO catalyst in the presence of p-chlorostyrene (p-Cl-St) and hydrogen All three comparative reaction sets show that the presence of hydrogen is necessary to complete the chain transfer reaction to p-chlorostyrene during the rac-Me$_2$Si[2-Me-4-Ph(Ind)]$_2$ZrCl$_2$/MAO mediated polymerization of propylene. In general, the change of hydrogen concentration does not have any significant effect the molecular weight and molecular weight distribution of the resulting polymer. However, a sufficient quantity of hydrogen, increasing with an increase in the concentration of p-Cl-St, is needed to achieve high catalyst activity. Overall, the chain transfer reaction to p-Cl-St (with rate constant $k_{tr}$) competes with the propagating reaction of propylene (with rate constant $k_p$). The degree of polymerization ($X_n$) follows a simple comparative equation $X_n = k_p[\text{propylene}]/k_{tr}[\text{p-Cl-St}]$ with a chain transfer constant $k_{tr}/k_p \sim 1/21.2$.

What is claimed is:

1. A polyolefin containing a terminal phienyl or substituted phenyl group, and having the structural formula:

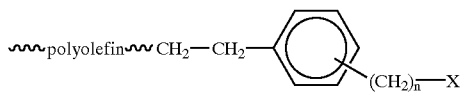

wherein polyolefin is a homopolymer or copolymer prepared by metallocene-mediated coordination polymerization of $C_3$–$C_{18}$ linear, branched or cyclic alpha-olefins, diolefins, or mixtures thereof, wherein the molecular weight of the polyolefin segment is above 500 g/mole, wherein the number of methylene spacer units (n) is from 0 to about 6, and wherein X is a member selected from the group consisting of H, Cl, Br, I, OH, $NH_2$, COOR, O—$BR_2$, O—$SiR_3$, $N(SiR_3)_2$, $BR_2$, $SiR_3$, CH=$CH_2$, COOH, COOLi, and succinic anhydride, where R is a $C_1$ to $C_{10}$ linear, branched, cyclic or aromatic alkyl group.

2. The polyolefin according to claim 1, wherein the molecular weight of said polyolefin segment is from about 10,000 to about 1,000,000.

3. The polyolefin according to claim 1, wherein the molecular weight of said polyolefin segment is from about 30,000 to about 300,000, and wherein n is from 0 to about 3.

4. The polyolefin according to claim 1, wherein said polymer is an isotactic polypropylene containing a terminal p-methylstyrene unit.

5. The polyolefin according to claim 2, wherein said polymer is an isotactic polypropylene containing a terminal p-methylstyrene unit.

6. The polyolefin according to claim 3, wherein said polymer is an isotactic polypropylene containing a terminal p-methylstyrene unit.

7. The polyolefin according to claim 1, wherein said polymer is an isotactic polypropylene containing a terminal p-chlorostyrene unit.

8. The polyolefin according to claim 2, wherein said polymer is an isotactic polypropylene containing a terminal p-chlorostyrene unit.

9. The polyolefin according to claim 3, wherein said polymer is an isotactic polypropylene containing a terminal p-chlorostyrene unit.

10. The polyolefin according to claim 1, wherein said polymer is an isotactic polypropylene containing a terminal unit selected from the group consisting of a p-hydroxystyrene unit and a p-aminostyrene unit.

11. The polyolefin according to claim 2, wherein said polymer is an isotactic polypropylene containing a terminal unit selected from the group consisting of a p-hydroxystyrene unit and a p-aminostyrene unit.

12. The polyolefin according to claim 3, wherein said polymer is an isotaetic polypropylene containing a terminal unit selected from the group consisting of a p-bydroxystyrene unit and a p-aminostyrene unit.

13. The polyolefin according to claim 1, wherein said polymer is an isotactic polypropylene containing a terminal p-hydroxystyrene unit.

14. The polyolefin according to claim 1, wherein said polymer is a poly(1-butene) containing a terminal group selected from the group consisting of a p-methylstyrene unit, a p-hydroxystyrene unit, a p-chlorostyrene unit and a p-aminostyrene unit.

15. The polyolefin according to claim 2, wherein said polymer is a poly(p-butene) containing a terminal group selected from the group consisting of a p-methyl styrene unit, a p-hydroxystyrene unit, a p-chlorostyrene unit and a p-aminostyrene unit.

16. The polyolefin according to claim 3, wherein said polymer is a poly(1-butene) containing a terminal group selected from the group consisting of a p-methylstyrene unit, a p-hydroxystyrene unit, a p-chlorostyrene unit and a p-aminostyrene unit.

17. A process for preparing a polyolefin containing a terminal pheniyl or substituted phenyl group, and having the structural formula:

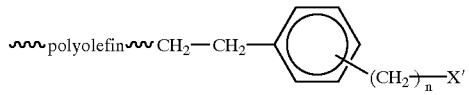

wherein polyolefin is a homopolymer or copolymer prepared by metallocene-mediated coordination polymerization of $C_3$–$C_{18}$ linear, branched or cyclic alpha-olefins, diolefins, or mixtures thereof, wherein the molecular weight of the polyolefin segment is above 500 g/mole, wherein the number of methylene spacer units (n) is from 0 to about 6, and wherein X' is a member selected from the group consisting of H, Cl, Br, I, COOR, O—$BR_2$, O—$SiR_3$, $N(SiR_3)_2$, $BR_2$, $SiR_3$, and CH=$CH_2$, where R is a member selected from the group consisting of $C_1$ to $C_{10}$ linear, branched, cyclic or aromatic alkyl group, which comprises: simultaneously contacting (a) one or more $C_3$–$C_{18}$ linear, branched or cyclic alpha-olefins, diolefins, or mixtures thereof with (b) styrene or styrene substituted with —$(CH_2)_n$—X', where n and X' are as defined above and with (c) hydrogen under polymerization conditions and in the presence of a metallocene catalyst having substituted covalently-bridged cyclopentadienyl ligands and having the structural formula

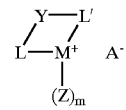

M is a transition metal of group III or IV of the Periodic Table of the Elements, L and L', independently, are selected from cyclopentadienyl or substituted cyclopentadienyl groups bound in $\eta^5$ bonding mode to metal, Y is a moiety selected from the group consisting of —$SiR'_2$—, —$CR'_2$—, and —$CR'_2$—$CR'_2$—, where each R', independently, is a member selected from the group consisting of hydrogen, alkyl, aryl, silyl, halogenated alkyl, halogenated aryl, and mixtures thereof, Z is selected from hydride, halo, alkyl, aryl, aryloxy, and alkoxy, m is 0 or 1, and $A^-$ is a non-coordinating, compatible anion.

18. The process according to claim 17, wherein M is selected from zirconium, titanium and hafnium.

19. The process according to claim 17, wherein said non-coordinating, compatible anion is derived from an aluminoxane or from a borate compound.

20. The process according to claim 19, wherein said non-coordinating, compatible anion is derived from a member selected from the group consisting of methylaluminoxane, tetra(pentafluorophenyl)borate, and methyltri(pentafluorophenyl)borate.

21. The process according to claim 17, wherein said one or more $C_3$–$C_{18}$ linear, branched or cyclic alpha-olefins, diolefins, or mixtures thereof, said styrene or styrene substituted with —(CH$_2$)$_n$—X', and said hydrogen are contacted in the presence of a hydrocarbon reaction diluent.

22. The process according to claim 21, wherein said hydrocarbon reaction diluent is a member selected the group consisting of propane, butane, cyclopentane, hexane, toluene, heptane, and mixtures thereof.

23. The process according to claim 21, wherein the polymer containing a terminal styrene or styrene derivative unit is formed as a slurry of particles in said reaction diluent.

24. The process according to claim 21, wherein the polymer containing a terminal styrene or styrene derivative unit is soluble in said reaction diluent and wherein the process takes place as a homogeneous solution process.

* * * * *